United States Patent Office

2,882,162
Patented Apr. 14, 1959

2,882,162

PROCESS FOR PRODUCING PUCKERED AND CURLED CEREAL FLAKES

John L. Holahan, Minneapolis, Minn., assignor to General Mills, Inc., a corporation of Delaware No Drawing. Application April 29, 1955
Serial No. 505,048

7 Claims. (Cl. 99—80)

The present invention relates to a method of producing a ready-to-eat cereal product.

One object of the invention is to produce a cereal flake having a high degree of pucker and curl, the reasons for desiring such characteristics in a cereal flake being at least twofold:

(1) A relatively strong flake is produced, thereby obviating to a large extent flake breakage or crippling, for in the same sense that ribbed sections increase the strength and rigidity of a flat plate without adding to its weight, puckering and curling of cereal flakes impart thereto similar qualities.

(2) The appearance of the flake is enhanced, avoiding the monotonous appearance of ordinary flat flakes.

Other objects, features, capabilities and advantages are comprehended by the invention, as will later appear and as are inherently possessed thereby.

While cereal making procedures have been developed in an attempt to achieve a good puckered and/or curled effect, these various procedures have involved certain shortcomings, whether in the actual method or in the final product. In seeking to devise a method that would be simple, inexpensive, and lend itself well to currently employed mass production techniques, it was discovered that if the outer layer of the grain berry or dough pellet, depending on which is to be flaked, could be made less plastic than its interior just prior to the flaking operation, then a superior product resulted. What apparently happens is that the less plastic outer layer or skin presents a resistive barrier, non-uniform in over-all tensile strength, which is capable of yielding in a multitude of minute regions to such an extent that the more plastic material breaks through and flows around the less fluid outer layer portions. Stated somewhat differently for better visualization, the outer layer of the grain berry or dough pellet is composed of small islands, distributed thereover in a random fashion, that possess various magnitudes or different degrees of tensile strength. This myriad of islands is not necesarily of sharp definition but provides various gradations of strength with intervening areas of weakness, all of course on a relative basis. The areas of weakness, sometimes even of such narrow width as to constitute mere lines, simply cannot withstand the internal pressure that is suddenly developed by the flaking rolls and the aforesaid "breaking through" results with the concomitant outward displacement of the more plastic inner material to produce the earlier alluded to "flow around." It is this distortive action that produces the sought after puckering and curling in the final flake. It might be pointed out that where the grain piece is comprised of endosperm and bran particles, at least some of the bran particles in the outer layer provide nuclei for the formation of said islands.

More specifically, the realization of a less plastic outer layer was gained by a rather abrupt modifying of the outer layer through sudden changes in temperature and/or moisture, both usually taking place in actual practice but to different degrees. By suitably limiting the period of time during which the modifying action takes place, it will be appreciated that a fairly contrasting plastic condition between the inner and outer layers of the grain berry or pellet can be made to occur. Technically speaking, there will be a plastic gradient produced, increasing inwardly, but for all intents and purposes it can be said that there prevails a less plastic exterior and a more plastic interior. Not only does this inner and outer differential exist, but, as already pointed out, the outer layer is non-uniform in its tensile properties so as to produce what has been termed the small "islands."

One nicety of the invention is that the degree of pucker and curl can be regulated from one extreme which is a flat flake to the other extreme which is a flake that is excessively puckered and curled. The exact time-temperature-moisture relations to be used may be varied to accommodate specific plant conditions.

Considering a normal prior art operation involving the flaking of a wheat berry, the wheat is subjected to the following steps:

(1) Tempering.
(2) Light flaking between flaking rolls to bump or crack the grain.
(3) Cooking in a pressure cooker with a suitable syrup for a given period of time under 15–30# pressure.
(4) Drying the cooked wheat to 17–24% moisture, preferably in the range of 18.5–20.5%.
(5) Tempering the wheat for many hours.
(6) Flaking.

In the case of a dough pellet, the dough ingredients are mixed together, cooked, extruded, sliced, dried, tempered and flaked. Basically, though, the two procedures are generally analogous.

In accordance with one aspect of the invention the results thereof can be achieved by taking the material from the dryer after drying at a temperature of from 200 to 250° F. for from 15 to 90 minutes and holding the material for varying times to regulate the degree of pucker. For example, if the holding time is less than one hour and if the material is wheat or oats, the flakes produced therefrom will be excessively puckered, because the outer layer will contain less moisture than the interior. On the other hand, if the material is held for six hours at 90° F. before flaking, the flakes will be quite flat in appearance, since six hours is apparently about the time it takes for the pellets to equalize in moisture at 90° F. following the non-uniform drying which occurs as the material is dried in a stream of hot air. In this connection it is to be remembered that it is the difference between the plastic condition of the inside as compared to the outside that sets the background for the production of cereal flakes having improved pucker and curl characteristics. In the instant example, the plastic differential has been obtained principally by having the outer layer or skin drier than the inner material, thus causing the inner material to be more plastic.

In the above example, material from the drier can be cooled to some temperature below 100° F. and then the resulting flakes will have the desired amount of pucker and curl. By regulating the temperature to which the flakes are cooled from 80–140° F., the degree of pucker and curl can also be regulated. In this instance, cooling serves to adjust the plastic characteristics of the inner material as desired while the plastic differential has been obtained principally by having the outer layer or skin drier than the inner material thus causing the inner material to be more plastic. Also in this example, since cooling has to proceed from the outside in, it is evident that the outer layer or skin will be somewhat cooler than the inner material. Hence, it will be appreciated that the degree of cooling may be controlled by the length of holding time, for if the holding period is relatively short (less than one hour as hereinbefore mentioned), then the flakes will be quite puckered because the material's interior will be warmer than its exterior, the latter having been directly exposed to the air's cooling action. If the holding period is quite long (six hours or more as stated above), then sufficient cooling will have taken place so as to equalize substantially the inner and outer temperatures, thus causing the flakes to have an undesired flat appearance.

Now, assuming that the berries of pellets have been held at room temperature (80–90° F.) for a period of over six hours, hence having become fairly uniform throughout in moisture, and are thereafter heated to a temperature in the range of 120 to 160° F., the heating being done in such fashion that no gross temperature or moisture difference results between the outer layer and the inner part of the berries or pellets, then again, fairly conventional flakes are obtained. If, on the other hand, the pellets or grain berries that have been held at room temperature for more than six hours are heated in a manner so as to cause a gross difference in temperature with an accompanying decrease in moisture between the outer layer and inner parts of the berry or pellet, then distorted flakes with excellent pucker and curl result. This gross temperature difference may be achieved by placing the pellets or wheat berries on a vibrating conveyor and passing them under an infra-red heating system, taking care to heat the pellets up in less than five minutes to a temperature in the range of from 100 to 350° F., thus making the outer layer much hotter than the inside of the pellets. In practice a temperature range of from 120 to 160° F. has proved effective when performed in a period of less than two minutes. Under the above general method the degree of pucker and curl is governed by the period of time the pellets are subjected to the infra-red heat, by the distance between the pellets and heat source, and by the intensity of said infra-red heat source.

Another factor that has been found to affect the pucker and curl attributes is the amount and size of the bran particles. For example where dough pellets are to be flaked, it will be appreciated that if the bran particle size in the pellet is comparatively large rather than microscopic, then the larger bran particles present in the outer layer afford respective nuclei for the formation of the hereinbefore mentioned numerous "islands," about which the more plastic inner endosperm will flow during the flaking step. In contradistinction, if the bran particles are relatively small, that is of microscopic dimensions, they seem to act in almost a reverse manner, tending to render the outer layer more uniform as far as tensile properties are concerned. Such action obviously militates against the production of good pucker and curl characteristics and is to be avoided as much as possible. By and large, the problem under discussion does not exist where whole wheat berries, rather than dough pellets, are employed, for here the light flaking step, that is step (2) as earlier herein set forth, is instrumental in producing only bran particles of relatively large dimensions.

The foregoing description is furnished by way of illustration and not of limitation, and it is therefore my intention that the invention be limited only by the appended claims or their equivalents wherein I have endeavored to claim broadly all inherent novelty. In this connection, it might be pointed out that the use of the term "grain piece" in the claims is to be construed as embracing what hereinbefore has been referred to as either a grain berry or dough pellet.

Now, therefore, I claim:

1. A method of producing a cereal flake comprising the steps of rapidly heating a cooked plastic grain piece to a temperature of from 100 to 350° F. in less than 5 minutes so that its outer layer is hotter and drier and less plastic than the interior of the piece, and subjecting said grain piece to a flaking operation to convert the piece to a flake, and to cause some of the more plastic inner material to break through portions of said outer layer.

2. A method of producing a cereal flake comprising the steps of preparing a cooked plastic grain piece, heating said grain piece to a temperature of from 100° to 350° F. in less than 5 minutes and then immediately flaking said grain piece.

3. A method of producing a cereal flake comprising the steps of cooking grain pieces to convert them to a plastic condition, partially drying the grain pieces, tempering the dried grain pieces, rapidly heating the exterior of said grain pieces to a temperature of from 100 to 350° F. in less than 5 minutes to render them hotter and drier and less plastic on the exterior than in the interior, and then immediately flaking said grain pieces.

4. A method of producing cereal flakes comprising the steps of producing a cooked cereal dough, extruding the dough into pellets, partially drying the pellets, tempering the pellets, suddenly heating the pellets to a temperature of from 100 to 350° F. in less than 5 minutes to make the exterior hotter and drier and less plastic than the interior and then immediately flaking the pellets.

5. A method of producing a cereal flake comprising the steps of drying a cooked plastic grain piece in an atmosphere of from 200 to 250° F. and from 15 to 90 minutes, removing the grain piece from the drying atmosphere, holding said grain piece at from 80 to 90° F. for a period longer than six hours permitting substantial equalization of moisture within the grain piece, heating said grain piece at from 100 to 350° F. in less than five minutes to render the inner portion of the grain piece more plastic than the outer portion, and then subjecting said grain piece to the pressural action of flaking rolls to cause some of the more plastic inner materials to break through portions of said outer layer.

6. A method in accordance with claim 5 in which said heating takes place at from 120 to 160° F. in less than two minutes.

7. A method in accordance with claim 5 in which the heating of the grain piece is effected by means of infra-red radiation.

References Cited in the file of this patent

UNITED STATES PATENTS

| | | |
|---|---|---|
| Re. 10,978 | Cormack | Jan. 1, 1889 |
| 400,835 | Donelson | Apr. 2, 1889 |
| 470,140 | Donelson | Mar. 1, 1892 |
| 1,364,634 | Lippen | Jan. 4, 1921 |
| 1,388,873 | McKay | Aug. 20, 1921 |
| 1,446,200 | Mulkey | Feb. 20, 1923 |
| 1,923,684 | Perky | Aug. 22, 1933 |

FOREIGN PATENTS

| | | |
|---|---|---|
| 677,088 | Great Britain | Aug. 6, 1952 |

OTHER REFFRENCES

"The Chemistry and Technology of Food and Food Products," vol. 3, 1951, by M. B. Jacobs et al., published by Interscience Publishers, Inc. (N.Y.), pp. 2078 to 2081.